United States Patent [19]
Incorvia et al.

[11] Patent Number: 6,103,141
[45] Date of Patent: Aug. 15, 2000

[54] DESICCANT DEPOSIT

[75] Inventors: Samuel A. Incorvia, Tonawanda; George E. McKedy, Amherst, both of N.Y.

[73] Assignee: Multisorb Technologies, Inc., Buffalo, N.Y.

[21] Appl. No.: 09/127,305

[22] Filed: Jul. 31, 1998

Related U.S. Application Data

[63] Continuation-in-part of application No. 08/787,986, Jan. 23, 1997, Pat. No. 5,962,333.

[51] Int. Cl.$^7$ ..................................................... C09K 3/00
[52] U.S. Cl. ............................. 252/194; 428/351; 524/35; 156/331.7
[58] Field of Search ..................... 428/355, 343, 428/351; 252/194; 156/331.7, 331.4; 524/35

[56] References Cited

U.S. PATENT DOCUMENTS

| | | |
|---|---|---|
| 3,492,258 | 1/1970 | Kremer . |
| 3,833,406 | 9/1974 | White . |
| 4,036,360 | 7/1977 | Deffeyes . |
| 4,407,897 | 10/1983 | Farrell et al. . |
| 4,730,726 | 3/1988 | Holzwarth . |
| 4,792,484 | 12/1988 | Moritani . |
| 4,894,277 | 1/1990 | Akasaki . |
| 4,935,346 | 6/1990 | Phillips et al. . |
| 4,970,172 | 11/1990 | Kundu . |
| 5,002,792 | 3/1991 | Vegoe . |
| 5,049,487 | 9/1991 | Phillips et al. . |
| 5,078,909 | 1/1992 | Shigeta et al. . |
| 5,108,706 | 4/1992 | Saggiorato . |
| 5,147,698 | 9/1992 | Cole . |
| 5,238,652 | 8/1993 | Sun et al. . |
| 5,304,419 | 4/1994 | Shores . |
| 5,304,468 | 4/1994 | Phillips et al. . |
| 5,460,777 | 10/1995 | Kitajima et al. . |
| 5,500,470 | 3/1996 | Mirle et al. . |
| 5,516,390 | 5/1996 | Tomita et al. . |
| 5,597,884 | 1/1997 | Bender ...................................... 528/34 |
| 5,801,220 | 9/1998 | Desai et al. ............................... 524/35 |

FOREIGN PATENT DOCUMENTS

WO 96/29603  9/1996  WIPO .

*Primary Examiner*—Lyle A. Alexander
*Attorney, Agent, or Firm*—Ratner & Prestia

[57] ABSTRACT

An adhesive desiccant deposit comprising a hot melt adhesive and a desiccant dispersed within the hot melt adhesive. The hot melt adhesive has sufficient porosity to allow water molecules to pass into the hot melt adhesive and contact the desiccant. The hot melt adhesive may optionally contain an additive to increase the porosity of the hot melt adhesive. One particular application of the deposit involves an adhesive desiccant tape comprising a substrate, a first adhesive layer disposed on the bottom of the substrate, a removable liner disposed on the first adhesive layer on the side of the first adhesive layer away from the substrate, and an adhesive desiccant deposit disposed on the top of the substrate.

16 Claims, 1 Drawing Sheet

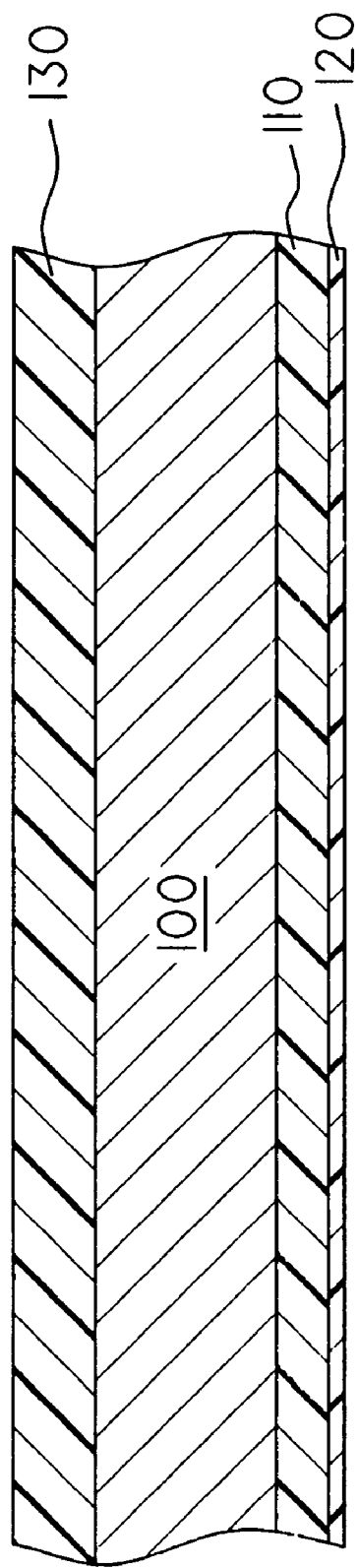

DESICCANT DEPOSIT

CROSS REFERENCE TO RELATED APPLICATION

This is a continuation-in-part application of U.S. Ser. No. 08/787,986 filed Jan. 23, 1997, now U.S. Pat. No. 5,962,333 which is herein incorporated by reference in its entirety.

FIELD OF THE INVENTION

This invention relates to desiccants, and more particularly to desiccant compositions which are designed to allow easy, efficient, and precise placement of the desiccant deposit wherever the user desires.

BACKGROUND OF THE INVENTION

Many applications exist in which it is desired to reduce ambient moisture by placing a desiccant in or near a particular area. These applications include such items as medical diagnostic test strips, food and medicine containers, and packaging materials.

A general method and apparatus used to position a desiccant near an object which is to be kept moisture-free involves the placement, near the object, of a pouch which contains a desiccant. In this conventional method, the pouch is made of a material which is water vapor permeable, and water vapor is allowed to permeate the pouch and be absorb ed by the desiccant inside the package. This method and apparatus allows loose desiccant, however, to exist inside the pouch. Such loose desiccant raises several potential problems.

The first problem is the risk of spillage of the desiccant if the pouch were to be punctured. That is particularly problematic where it is desired that the desiccant and material which is to be kept dry should not contact one another. It is also problematic where desiccant grains could interfere with, or contaminate, a nearby machine or material. A further risk involves ingestion of the desiccant. This is especially likely if the desiccant pouch application involves food or medicine. All of these risks are associated with the use of desiccants loosely contained inside a permeable pouch.

A second potential problem with the above use involves the difficulty which exists in placing an exact amount of desiccant in close proximity to the material to be kept dry where the material or its location is very small and difficult to reach. Often, where pouches of desiccant material are used, or loose desiccant material is glued to a surface, packages must be modified to accommodate the bulk desiccant. Where that arrangement is necessary, packaging inefficiencies are present. Also, in such cases, alternative methods and devices must be used to place the desiccant effectively.

Medical diagnostic test strips are used, for example, in a variety of applications. Such strips are exposed to samples of blood, feces, or urine, for example, where specific reagents on the test strip are designed to detect various components in the sample. Medical diagnostic test strips are specifically used to detect the level of glucose in a patient's blood. Such test strips must be exposed to an atmosphere that is substantially moisture-free until moments before use in testing a sample. The strips are often highly water absorbent, and absorption of moisture may alter test results.

Accordingly, the known industry practice for keeping the test strips dry is to contain a plurality of such test strips in a container or vial. The cap for the container has a desiccant contained in it to absorb water from the air inside the container. In this manner, the strips within the container are kept dry. When ultimately used, a doctor or other testing personnel, including a patient himself removes the cap from the container, extracts one of the test strips, and immediately places it in the sample to be tested (or places a small quantity of the sample to be tested on the test strip). Exposure of the strips to the ambient atmosphere before use is thus minimized to reduce water vapor absorption by the test strip.

Potential problems with this are many, but include the difficulty associated with the placement of the desiccant into the cap. Some methods which have been developed to achieve desiccant placement in this configuration include gluing the desiccant gel into a lid, or actually constructing a cap out of a desiccant-containing plastic. These methods are specialized, however, and often require difficult manufacturing techniques.

The deficiencies of the conventional desiccant applications show that a need still exists for a desiccant technology which allows precise, controlled, and easy placement of the desiccant in a location and in an amount which is desired. Therefore, one object of the present invention is to provide a desiccant technology which allows easy, precise, and controlled placement of a desiccant into small areas. Another object of the present invention is to provide a desiccant technology which allows easy placement of a consistent and controlled amount of desiccant over a large area. Yet another object of the present invention is to provide a desiccant technology which allows a user to apply a desiccant through simple devices. Still another object of the present invention is to provide a desiccant technology which allows the use of a desiccant in close proximity to other materials without the risk of loose desiccant falling free and causing subsequent problems.

SUMMARY OF THE INVENTION

To achieve these and other objects, and in view of its purposes, the present invention provides an adhesive desiccant deposit comprising a desiccant gel dispersed within a hot melt adhesive. The hot melt adhesive has sufficient porosity to allow water molecules to pass into the hot melt adhesive and contact the desiccant gel. The hot melt adhesive may optionally contain additives such as cellulose, silica, or other suitable materials to increase its porosity. The adhesive desiccant deposit allows easy, efficient, and precise placement of controlled amounts of desiccant wherever the user desires. One particular embodiment of the invention involves an adhesive desiccant tape comprising a substrate with a top and a bottom, a first adhesive layer disposed on the bottom of the substrate, a removable liner disposed on the first adhesive layer on the side of the first adhesive layer away from the substrate, and an adhesive desiccant deposit disposed on the top of the substrate. During manufacturing of the tape, the adhesive desiccant deposit is easily placed along the top of the substrate by allowing it to flow, while heated, onto the substrate, and then allowing it to cool. The product is a tape with a uniform desiccant composition which can be easily applied to the surface of a container or other material where it is desired to absorb water.

BRIEF DESCRIPTION OF THE DRAWING

The invention is best understood from the following detailed description when read in connection with the accompanying drawing. It is emphasized that the various features of the drawing are not to scale. On the contrary, the dimensions of the various features are arbitrarily expanded or reduced for clarity. Included in the drawing is the following FIGURE:

FIG. 1 is a cross sectional view of the tape according to the present invention.

DETAILED DESCRIPTION OF THE INVENTION

The present invention involves an adhesive desiccant deposit comprising a desiccant gel dispersed within a hot melt adhesive. The hot melt adhesive is selected such that it has sufficient porosity to allow water molecules to pass into the adhesive matrix and contact the desiccant contained in the matrix (i.e., the hot melt adhesive is water permeable). The adhesive desiccant deposit allows easy, efficient, and precise placement of controlled amounts of desiccant wherever the user desires. Many applications exist where the combined desiccant and hot melt adhesive matrix (the desiccant deposit) can be used. These applications are discussed below, and include the use of the desiccant deposit in different ways to meet the needs of industry where improved desiccant technology is particularly needed.

One particular embodiment of the invention is illustrated in FIG. 1. FIG. 1 shows an adhesive desiccant tape comprising a substrate 100, a first adhesive layer 110 disposed on the bottom of the substrate, a removable liner 120 disposed on the first adhesive layer, and a desiccant deposit 130 disposed on the top of the substrate. During manufacturing of the tape, the desiccant deposit 130 is easily placed along the top of the substrate by allowing it to flow, while heated, onto the substrate 100, and then allowing it to cool. The product is a tape with a uniform desiccant composition covering its surface which can be easily applied to the surface of a container or other material where water adsorption is desired. The desiccant deposit on top of the substrate is uniform both with respect to concentration of desiccant and also overall thickness.

An aspect of the present invention includes an improved process of manufacturing. The process can be automated and can place exact amounts of desiccant onto packages or other materials. The ability of the desiccant deposit to flow when heated allows it to be placed where it is needed, in the shape in which it is needed, and in the amount in which it is needed. This ability provides not only improved space efficiencies in the manufacturing process, but also in the final product. Less desiccant is wasted when the exact amount which is needed can be precisely placed.

The present invention also allows the placement of a relatively thin layer of desiccant over a large area or sheet. Thus, a "flood coat" may be applied to a large sheet of substrate material, such as in the case of applying the desiccant deposit to the substrate during the manufacturing of the tape as discussed above. The thickness of the layer will vary depending on the application, but a preferred range for many flood coat applications is 0.001 to 0.05 inches thick. An even more preferred range is 0.001 to 0.03 inches thick.

The present invention also allows the "printing" of the desiccant deposit. Standard printing technologies may also be used in accordance with the desiccant deposit of the present invention. In such cases, the material printed, usually through a metal screen, is the desiccant deposit itself.

Another benefit provided by the deposit of the present invention is the ability to apply it very simply. One such simple application procedure involves using it in an ordinary glue gun. The user places the desiccant deposit, in the form of a stick or other suitable shape, into a glue gun, heats the deposit material, and applies the deposit where the desiccant is needed.

Still another benefit of the present invention is that it prevents desiccant from becoming loose (particularly problematic in several conventional technologies) and contacting, contaminating, or otherwise interfering with surrounding materials or equipment. The desiccant deposit of the present invention provides an enclosed polymer matrix in which the desiccant gel is contained. Thus, water vapor can enter the matrix and be adsorbed, but the desiccant will not fall free from the hot melt adhesive.

The desiccant deposit comprises a hot melt adhesive with a desiccant dispersed within it. Generally, any appropriate hot melt adhesive and desiccant can be used for this purpose. The adhesive serves two primary "adhesive" functions. First, the adhesive contains the desiccant, holding it in place. Second, the adhesive allows the placement of the desiccant and hot melt adhesive combination deposit onto a particular surface. Of course, the adhesive serves other functions, such as limiting, based on size, what molecules may enter and contact the desiccant. The hot melt adhesive must be porous enough, of course, to allow water molecules to enter and move within it. Certain molecules which are larger than water would be prevented, perhaps, from entering the adhesive, depending on the particular hot melt adhesive selected.

The hot melt adhesive may optionally include cellulose, silica, or other suitable materials to increase its porosity. The presence of such an additive in the matrix impacts the rate of absorption of water vapor. More particularly, the amount of additive (e.g. cellulose) can be controlled to achieve a desired overall rate of absorption. For example, the greater the cellulose concentration, the faster the overall rate of absorption.

The performance of the present invention is affected by the particular selection of hot melt adhesives. Some adhesives work better than others, but one skilled in the art can easily determine which ones meet the needs of a particular application. Typical examples include ethyl vinyl acetate, polyurethane and vinyl acetate. For example, one of the best hot melt adhesives is ethyl vinyl acetate (EVA). But even within the varying types of EVAs, it has been found that some work better than others. Optimization of desiccant deposit performance can be made easily, however, without undue experimentation by one skilled in the art.

Regarding the size of desiccant selected, consideration should be given to the desired final thickness of the deposit layer. The mesh size of a silica gel, for example, should never be larger than the thickness of the deposit coating. Obviously, if it were, an uneven surface, and exposed desiccant, could result. Thus, for example, if a deposit thickness of 0.002 inches were desired, the particular silica gel selected would have a particle size less than 0.002 inches.

The type of desiccant used can also vary. Silica gels ($SiO_2$ based compounds), calcium oxides, activated carbon, and molecular sieves can all be used in accordance with this invention. These are only some examples of effective desiccants which can be mixed with the hot melt adhesives. In addition, both indicating and non-indicating desiccants can be used, and reversible and irreversible desiccants can be used. Non-indicating desiccants remain the same color (or clear) no matter what amount of moisture has been absorbed. Indicating desiccants change color as moisture is absorbed. Reversible desiccants can be dried and reused. Irreversible desiccants cannot be reused once saturated. Moreover, selection of desiccant and hot melt adhesive can be made by one skilled in the art based on particular applications.

The above text has addressed the invention in general terms. The following specific examples are offered to define the invention further, but in no way limit the invention. In the embodiments of the present invention discussed below, particular desiccant and adhesive combinations are illustrated. Additional desiccants and adhesives may be combined in any of the embodiments as necessary for a particular application.

EXAMPLE 1

A desiccant deposit was formed by dispersing different amounts of silica gels in vinyl acetate by mixing the components in a conventional mixer until a homogeneous mixture was produced. The deposits were spread over a three square inch area using a draw-down bar by applying several thin layers over one another, allowing each layer to dry before applying the next layer. The weight of the deposits were measured at various times over a seven day period. Over the first four days, there was 40% relative humidity. The results are tabulated below. The increase in weight of the deposits reflects the amount of moisture absorbed. The data show good moisture absorption by the deposits.

ABSORPTION OF MOISTURE BY A DEPOSIT CONTAINING SILICA GEL

| Sample | % of Silica Gel | Original Weight (grams) | 2 Days (grams) | 4 Days (grams) | 7 Days (grams) |
|---|---|---|---|---|---|
| #1 | 50% | .303 | .303 | .304 | .306 |
| #2 | 50% | .305 | .305 | .306 | .307 |
| #3 | 50% | .318 | .318 | .320 | .349 |
| #4 | 35% | .313 | .313 | .314 | .314 |
| #5 | 35% | .317 | .317 | .318 | .319 |
| #6 | 35% | .319 | .320 | .321 | .323 |

1, 2, 3: 50% 7–10 micron Grace Syloid AL-1 silica gel in B-15 vinyl acetate homopolymer (available from Air Products), ethanol used as the solvent.
4, 5, 6: 35% 7–10 micron Grace Syloid AL-1 silica gel in B-15 vinyl acetate homopolymer (available from Air Products), ethanol used as the solvent.

EXAMPLE 2

A desiccant deposit was made by dispersing 41% by weight 50 mesh silica gel (non-indicating) in a conventional hot melt adhesive. Three samples were produced and deposited as drops on foil for moisture absorption testing. The results are tabulated below.

| Sample number: | 1 | 2 | 3 |
|---|---|---|---|
| Resin weight (g): | 4.45 | 4.14 | 4.17 |
| Total sample weight (g): | 5.01 | 4.78 | 4.71 |
| Moisture absorbed after 5 days (g): | 0.02 | 0.03 | 0.03 |
| Moisture absorbed after 10 days (g): | 0.05 | 0.05 | 0.04 |
| Moisture absorbed after 17 days (g): | 0.08 | 0.08 | 0.08 |
| Moisture absorbed after 21 days (g): | 0.09 | 0.09 | 0.09 |

EXAMPLE 3

A desiccant deposit was made by dispersing 40% by weight 50 mesh silica gel (non-indicating) in H.B. Fuller HM 1072 hot melt adhesive. Three samples were produced and deposited as drops on foil for moisture absorption testing. The results are tabulated below.

| Sample number: | 1 | 2 | 3 |
|---|---|---|---|
| Resin weight (g): | 5.39 | 4.05 | 4.14 |
| Total sample weight (g): | 6.09 | 4.74 | 4.73 |
| Moisture absorbed after 5 days (g): | 0.08 | 0.05 | 0.04 |
| Moisture absorbed after 10 days (g): | 0.12 | 0.09 | 0.08 |
| Moisture absorbed after 17 days (g): | 0.16 | 0.11 | 0.09 |
| Moisture absorbed after 21 days (g): | 0.19 | 0.14 | 0.10 |

EXAMPLE 4

Another desiccant deposit was made by dispersing 40% by weight 50 mesh silica gel (non-indicating) in H.B. Fuller HM 1072 hot melt adhesive. Three samples were produced and deposited as drops on foil for moisture absorption testing. The results are tabulated below.

| Sample number: | 1 | 2 | 3 |
|---|---|---|---|
| Resin weight (g): | 3.90 | 4.46 | 3.45 |
| Total sample weight (g): | 4.58 | 5.04 | 4.05 |
| Moisture absorbed after 5 days (g): | 0.08 | 0.06 | 0.05 |
| Moisture absorbed after 10 days (g): | 0.13 | 0.12 | 0.09 |
| Moisture absorbed after 17 days (g): | 0.16 | 0.14 | 0.12 |
| Moisture absorbed after 21 days (g): | 0.17 | 0.17 | 0.12 |

EXAMPLE 5

A desiccant deposit was made by dispersing 40% by weight 50 mesh silica gel in Eco hot melt adhesive. Three samples were produced and deposited as drops on foil for moisture absorption testing. The results are tabulated below.

| Sample number: | 1 | 2 | 3 |
|---|---|---|---|
| Resin weight (g): | 4.15 | 3.47 | 5.06 |
| Total sample weight (g): | 4.70 | 4.06 | 5.62 |
| Moisture absorbed after 5 days (g): | 0.00 | 0.05 | 0.07 |
| Moisture absorbed after 10 days (g): | 0.05 | 0.11 | 0.11 |
| Moisture absorbed after 17 days (g): | 0.13 | 0.13 | 0.16 |
| Moisture absorbed after 21 days (g): | 0.15 | 0.13 | 0.18 |

EXAMPLE 6

A desiccant deposit was made by dispersing 40% by weight indicating silica gel in a hot melt adhesive. Three samples were produced and deposited as drops on foil for moisture absorption testing. The results are tabulated below.

| Sample number: | 1 | 2 | 3 |
|---|---|---|---|
| Resin weight (g): | 4.31 | 3.91 | 3.99 |
| Total sample weight (g): | 4.82 | 4.48 | 4.57 |
| Moisture absorbed after 5 days (g): | 0.16 | 0.15 | 0.17 |
| Moisture absorbed after 10 days (g): | 0.22 | 0.86 | 0.24 |
| Moisture absorbed after 17 days (g): | 0.28 | 0.90 | 0.28 |
| Moisture absorbed after 21 days (g): | 0.31 | 0.93 | 0.30 |

EXAMPLE 7

A desiccant deposit was made by dispersing 40% by weight 50 mesh non-indicating silica gel in store-bought hot melt adhesive. Three samples were produced and deposited as drops on foil for moisture absorption testing. The results are tabulated below.

| Sample number: | 1 | 2 | 3 |
|---|---|---|---|
| Resin weight (g): | 3.79 | 3.91 | 4.45 |
| Total sample weight (g): | 4.34 | 4.48 | 5.12 |
| Moisture absorbed after 5 days (g): | 0.12 | 0.15 | 0.13 |
| Moisture absorbed after 10 days (g): | 0.16 | 0.20 | 0.19 |
| Moisture absorbed after 17 days (g): | 0.23 | 0.25 | 0.24 |
| Moisture absorbed after 21 days (g): | 0.24 | 0.27 | 0.25 |

EXAMPLE 8

A desiccant deposit was made by dispersing 40% by weight indicating silica gel in a conventional hot melt adhesive. Three samples were produced and deposited as drops on foil for moisture absorption testing. The results are tabulated below.

| Sample number: | 1 | 2 | 3 |
|---|---|---|---|
| Resin weight (g): | 5.09 | 4.49 | 4.93 |
| Total sample weight (g): | 5.70 | 5.16 | 5.50 |
| Moisture absorbed after 5 days (g): | 0.04 | 0.05 | 0.04 |
| Moisture absorbed after 10 days (g): | 0.07 | 0.22 | 0.07 |
| Moisture absorbed after 17 days (g): | 0.10 | 0.23 | 0.10 |
| Moisture absorbed after 21 days (g): | 0.12 | 0.12 | 0.11 |

EXAMPLE 9

A desiccant deposit was made by dispersing 40% by weight indicating silica gel in FPC 725 hot melt adhesive. Three samples were produced and deposited as drops on foil. Additional silica gel was sprinkled on top of the drops. Moisture absorption test results are tabulated below.

| Sample number: | 1 | 2 | 3 |
|---|---|---|---|
| Weight of foil (g): | 0.62 | 0.56 | 0.62 |
| Weight of foil, resin, and gel (g): | 5.75 | 6.85 | 7.20 |
| Weight with sprinkled gel (g): | 6.41 | 7.50 | 7.66 |
| Moisture absorbed after 3 days (g): | 0.35 | 0.38 | 0.10 |
| Moisture absorbed after 7 days (g): | 0.36 | 0.43 | 0.10 |

EXAMPLE 10

A desiccant deposit was made of FPC 725 hot melt adhesive. Three samples were produced and deposited as drops on foil. Silica gel was sprinkled on top of the drops. Moisture absorption test results are tabulated below.

| Sample number: | 1 | 2 | 3 |
|---|---|---|---|
| Weight of foil (g): | 0.54 | 0.62 | 0.45 |
| Weight of foil, resin, and gel (g): | 4.23 | 6.91 | 3.50 |
| Weight with sprinkled gel (g): | 6.41 | 7.50 | 7.66 |
| Moisture absorbed after 3 days (g): | 0.13 | 0.26 | 0.07 |
| Moisture absorbed after 7 days (g): | 0.13 | 0.26 | 0.07 |

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An adhesive desiccant deposit comprising:
   a hot melt adhesive;
   a desiccant dispersed within said hot melt adhesive, said desiccant selected from the group consisting of silica, calcium oxides, activated carbon, molecular sieves, and combinations thereof; and
   a cellulose additive to increase the porosity of said hot melt adhesive;
   said hot melt adhesive having sufficient porosity to allow water molecules to pass into said hot melt adhesive and contact said desiccant.

2. The desiccant deposit of claim 1 wherein said hot melt adhesive is selected from the group consisting of vinyl acetate, ethyl vinyl acetate, polyurethane, and combinations thereof.

3. The desiccant deposit of claim 1 wherein said desiccant is selected from the group consisting of silica gel, calcium oxide, molecular sieves, activated carbon, and combinations thereof.

4. The desiccant deposit of claim 1 wherein said desiccant is an indicating desiccant.

5. The desiccant deposit of claim 1 wherein said desiccant is a non-indicating desiccant.

6. The desiccant deposit of claim 1 wherein said desiccant is a reversible desiccant.

7. The desiccant deposit of claim 1 wherein said desiccant is an irreversible desiccant.

8. The desiccant deposit of claim 1 wherein said desiccant is a silica gel.

9. An adhesive desiccant tape comprising:
   a substrate with a top and a bottom;
   a first adhesive layer disposed on said bottom of said substrate;
   a removable liner disposed on said first adhesive layer on the side of said first adhesive layer away from said substrate; and
   an adhesive desiccant deposit disposed on said top of said substrate, said adhesive desiccant deposit comprising a hot melt adhesive which has both a desiccant and a cellulose additive to increase the porosity of said hot melt adhesive dispersed within said hot melt adhesive, said desiccant selected from the group consisting of silica, calcium oxides, activated carbon, molecular sieves, and combinations thereof; and said hot melt adhesive having sufficient porosity to allow water molecules to pass into said hot melt adhesive and contact said desiccant.

10. The desiccant tape of claim 9 wherein said hot melt adhesive is selected from the group consisting of vinyl acetate, ethyl vinyl acetate, polyurethane, and combinations thereof.

11. The desiccant tape of claim 9 wherein said desiccant is selected from the group consisting of silica gel, calcium oxide, molecular sieves, activated carbon, and combinations thereof.

12. The desiccant tape of claim 9 wherein said desiccant is an indicating desiccant.

13. The desiccant tape of claim 9 wherein said desiccant is a non-indicating desiccant.

14. The desiccant tape of claim 9 wherein said desiccant is a reversible desiccant.

15. The desiccant tape of claim 9 wherein said desiccant is an irreversible desiccant.

16. The desiccant tape of claim 9 wherein said desiccant is a silica gel.

* * * * *